(12) United States Patent
Grootwassink et al.

(10) Patent No.: US 10,334,037 B2
(45) Date of Patent: Jun. 25, 2019

(54) PEER-TO-PEER RENDEZVOUS SYSTEM FOR MINIMIZING THIRD PARTY VISIBILITY AND METHOD THEREOF

(71) Applicant: Yaana Technologies, Inc., Milpitas, CA (US)

(72) Inventors: David Grootwassink, Safety Harbor, FL (US); Rajesh Puri, Fremont, CA (US); Michael P. Hammer, Reston, VA (US)

(*) Notice: Subject to any disclaimer, the term of this patent is extended or adjusted under 35 U.S.C. 154(b) by 91 days.

(21) Appl. No.: 14/489,272

(22) Filed: Sep. 17, 2014

(65) Prior Publication Data
US 2015/0281344 A1    Oct. 1, 2015

Related U.S. Application Data

(60) Provisional application No. 61/973,072, filed on Mar. 31, 2014.

(51) Int. Cl.
*H04L 9/32* (2006.01)
*H04L 29/08* (2006.01)
(Continued)

(52) U.S. Cl.
CPC .......... *H04L 67/104* (2013.01); *H04L 9/0827* (2013.01); *H04L 9/0869* (2013.01);
(Continued)

(58) Field of Classification Search
CPC ............... H04L 63/0428; H04L 67/104; H04L 63/0414; H04L 29/06646; H04L 61/1535
See application file for complete search history.

(56) References Cited

U.S. PATENT DOCUMENTS 6,266,704 B1 *  7/2001  Reed .................. H04L 45/00
                                                   709/238
6,377,688 B1    4/2002  Numao
(Continued)

FOREIGN PATENT DOCUMENTS

CN    103838593    6/2014
CN    104869181    8/2015
(Continued)

OTHER PUBLICATIONS

Arnedo-Moreno et. al., JXTA resource access control by means of advertisement encryption, 2009, Elsevier.*
(Continued)

*Primary Examiner* — Trong H Nguyen
(74) *Attorney, Agent, or Firm* — Goodwin Procter LLP

(57) ABSTRACT

A method and system for enabling peer-to-peer (P2P) communication between a first device and a second device is disclosed. According to one embodiment, a P2P communication system includes a first peer agent serving a first peer, a second peer agent serving a second peer, and a rendezvous server. The rendezvous server updates a first IP address for the first peer agent to the second peer agent and a second IP address for the second peer agent to the first peer agent. The first peer agent and the second peer agent communicate with the rendezvous server by dropping and retrieving a plurality of dead-drop packages. A first dead-drop package of the plurality of dead-drop packages comprises a first alias that is known only to the first peer and the second peer. A second dead-drop package of the plurality of dead-drop packages comprises a second alias that is different from the first alias.

57 Claims, 8 Drawing Sheets

(51) Int. Cl.
*H04L 9/08* (2006.01)
*H04L 29/12* (2006.01)
(52) U.S. Cl.
CPC ...... *H04L 61/1535* (2013.01); *H04L 61/2575* (2013.01); *H04L 61/2589* (2013.01); *H04L 61/2514* (2013.01); *H04L 2209/42* (2013.01)

(56) References Cited

U.S. PATENT DOCUMENTS

| | | |
|---|---|---|
| 6,529,441 B1 | 3/2003 | Cummins |
| 6,574,609 B1 | 6/2003 | Downs |
| 6,765,892 B1 | 7/2004 | Leung |
| 6,785,740 B1 | 8/2004 | Yoneda |
| 6,990,352 B2 | 1/2006 | Pyhaelammi |
| 7,082,532 B1 | 7/2006 | Vick |
| 7,146,009 B2 | 12/2006 | Andivahis |
| 7,383,433 B2 | 6/2008 | Yeager |
| 7,536,464 B1 | 5/2009 | Dommety |
| 7,561,517 B2 | 7/2009 | Klinker |
| 7,620,033 B2 | 11/2009 | Chu |
| 7,634,522 B1 | 12/2009 | Carter |
| 7,653,815 B2 | 1/2010 | Godfrey |
| 7,739,496 B2 | 6/2010 | Jacobs |
| 7,783,901 B2 | 8/2010 | Carrico |
| 7,796,760 B2 | 9/2010 | Brettle |
| 7,809,943 B2 | 10/2010 | Seidel |
| 7,849,053 B2 | 12/2010 | Wolff |
| 7,961,663 B2 | 6/2011 | Lin |
| 7,966,000 B2 | 6/2011 | Semple |
| 7,969,968 B2 | 6/2011 | De Luca |
| 7,991,158 B2 | 8/2011 | Narendra |
| 8,068,606 B2 | 11/2011 | Schneider |
| 8,149,994 B2 | 4/2012 | Yoon |
| 8,195,147 B2 | 6/2012 | Bonnet |
| 8,218,490 B2 | 7/2012 | Rydnell |
| 8,264,989 B2 | 9/2012 | Suzuki |
| 8,275,891 B2 | 9/2012 | Yasrebi |
| 8,295,830 B1 | 10/2012 | Faccin |
| 8,311,956 B2 | 11/2012 | Sen |
| 8,363,664 B2 | 1/2013 | Ramankutty |
| 8,417,224 B1 | 4/2013 | Young |
| 8,452,957 B2 | 5/2013 | Pourzandi |
| 8,472,384 B2 | 6/2013 | Shu |
| 8,516,244 B2 | 8/2013 | Waters |
| 8,560,835 B2 | 10/2013 | Johansson |
| 8,599,747 B1 | 12/2013 | Saleem |
| 8,634,810 B2 | 1/2014 | Barkie |
| 8,646,063 B2 | 2/2014 | Dowlatkhah |
| 8,667,182 B2 | 3/2014 | Huang |
| 8,667,570 B2 | 3/2014 | Bari |
| 8,677,148 B2 | 3/2014 | O'Hare |
| 8,713,320 B2 | 4/2014 | Xu |
| 8,738,898 B2 | 5/2014 | Herwono |
| 8,738,916 B2 | 5/2014 | Klassen |
| 8,755,342 B2 | 6/2014 | Iyer |
| 8,755,370 B1 | 6/2014 | Biswas |
| 8,755,392 B2 | 6/2014 | Traversat |
| 8,811,401 B2 | 8/2014 | Stroud |
| 8,831,227 B2 | 9/2014 | Ge |
| 8,867,339 B2 | 10/2014 | Hu |
| 8,891,407 B2 | 11/2014 | Collins |
| 8,924,574 B2 | 12/2014 | Alex |
| 8,996,854 B2 | 3/2015 | Hamalainen |
| 9,013,992 B2 | 4/2015 | Perkins |
| 9,036,540 B2 | 5/2015 | Bu |
| 9,047,107 B2 | 6/2015 | Walsh |
| 9,172,703 B2 | 10/2015 | Chaturvedi |
| 9,191,803 B2 | 11/2015 | Patel |
| 9,225,647 B2 | 12/2015 | Manuguri |
| 9,230,001 B2 | 1/2016 | Magdon-Ismail |
| 9,325,495 B2 | 4/2016 | Roberts |
| 9,379,891 B2 | 6/2016 | Yoon |
| 9,383,969 B2 | 7/2016 | Van Der Sluis |
| 9,432,258 B2 | 8/2016 | Van Der Merwe |
| 9,473,574 B2 | 10/2016 | Vandwalle |
| 9,712,421 B2 | 7/2017 | Dolson |
| 9,736,111 B2 | 8/2017 | Lopez Da Silva |
| 9,860,195 B2 | 1/2018 | Javali |
| 9,876,759 B2 | 1/2018 | Ghai |
| 2002/0156987 A1 | 10/2002 | Gajjar |
| 2002/0166056 A1 | 11/2002 | Johnson |
| 2003/0070070 A1 | 4/2003 | Yeager |
| 2003/0081607 A1 | 5/2003 | Kavanagh |
| 2003/0133443 A1 | 7/2003 | Klinker |
| 2003/0147536 A1 | 8/2003 | Andivahis |
| 2004/0034776 A1 | 2/2004 | Fernando |
| 2004/0034778 A1 | 2/2004 | Celik |
| 2004/0042416 A1 | 3/2004 | Ngo |
| 2004/0064688 A1* | 4/2004 | Jacobs ................ H04L 63/0245 713/150 |
| 2004/0067761 A1 | 4/2004 | Pyhalammi |
| 2004/0083297 A1* | 4/2004 | Gazzetta ................ H04L 51/04 709/229 |
| 2004/0196978 A1 | 10/2004 | Godfrey |
| 2004/0213179 A1 | 10/2004 | Lundin |
| 2004/0264405 A1 | 12/2004 | MacGregor Scobbie |
| 2004/0266397 A1 | 12/2004 | Smith |
| 2005/0053068 A1 | 3/2005 | Toth |
| 2005/0094651 A1 | 5/2005 | Lutz |
| 2005/0120160 A1 | 6/2005 | Plouffe |
| 2005/0259637 A1 | 11/2005 | Chu |
| 2006/0046714 A1 | 3/2006 | Kalavade |
| 2006/0059091 A1 | 3/2006 | Wang |
| 2006/0204007 A1 | 9/2006 | Doetzkies |
| 2006/0224883 A1 | 10/2006 | Khosravi |
| 2006/0236092 A1 | 10/2006 | Hamalainen |
| 2007/0006296 A1 | 1/2007 | Nakhjiri |
| 2007/0087756 A1 | 4/2007 | Hoffberg |
| 2007/0100981 A1 | 5/2007 | Adamczyk |
| 2007/0156632 A1 | 7/2007 | Wolff |
| 2008/0076425 A1 | 3/2008 | Khetawat |
| 2008/0089239 A1 | 4/2008 | Todd |
| 2008/0101345 A1 | 5/2008 | Suzuki |
| 2008/0107096 A1 | 5/2008 | Huang |
| 2008/0137825 A1 | 6/2008 | Yoon |
| 2008/0155278 A1 | 6/2008 | Carrico |
| 2008/0212782 A1 | 9/2008 | Brettle |
| 2008/0279381 A1 | 11/2008 | Narendra |
| 2008/0285452 A1 | 11/2008 | Oran |
| 2009/0060175 A1 | 3/2009 | Schneider |
| 2009/0088147 A1 | 4/2009 | Bu |
| 2009/0259532 A1 | 10/2009 | Bergstraesser |
| 2009/0287922 A1 | 11/2009 | Herwono |
| 2009/0305688 A1 | 12/2009 | Bonnet |
| 2010/0039993 A1 | 2/2010 | Ramankutty |
| 2010/0086119 A1 | 4/2010 | De Luca |
| 2010/0125855 A1 | 5/2010 | Ferwerda |
| 2010/0174907 A1 | 7/2010 | Semple |
| 2010/0246500 A1 | 9/2010 | Rydnell |
| 2011/0016399 A1 | 1/2011 | Yasrebi |
| 2011/0040706 A1 | 2/2011 | Sen |
| 2011/0040858 A1 | 2/2011 | Gum |
| 2011/0069663 A1 | 3/2011 | Shu |
| 2011/0075675 A1 | 3/2011 | Koodli |
| 2011/0141947 A1 | 6/2011 | Li |
| 2011/0154022 A1 | 6/2011 | Cheng |
| 2011/0170545 A1 | 7/2011 | Zheng |
| 2011/0182183 A1 | 7/2011 | Perkins |
| 2011/0191469 A1 | 8/2011 | Oran |
| 2011/0216646 A1 | 9/2011 | Flinta |
| 2011/0219123 A1* | 9/2011 | Yang ................ H04L 29/12103 709/227 |
| 2011/0264906 A1 | 10/2011 | Pourzandi |
| 2011/0268121 A1 | 11/2011 | Karino |
| 2011/0320592 A1 | 12/2011 | Kemmerer |
| 2012/0030683 A1 | 2/2012 | Kurdi |
| 2012/0084288 A1 | 4/2012 | Abdul-Razzak |
| 2012/0120788 A1 | 5/2012 | Hu |
| 2012/0191860 A1* | 7/2012 | Traversat ............. G06F 9/4416 709/226 |
| 2012/0198241 A1 | 8/2012 | O'Hare |
| 2012/0297087 A1 | 11/2012 | Humble |
| 2012/0314854 A1 | 12/2012 | Waters |
| 2012/0331298 A1 | 12/2012 | Xu |

(56) References Cited

U.S. PATENT DOCUMENTS

| | | | |
|---|---|---|---|
| 2013/0042112 A1 | 2/2013 | Spector | |
| 2013/0080586 A1 | 3/2013 | Attanasio | |
| 2013/0084896 A1 | 4/2013 | Barkie | |
| 2013/0091526 A1 | 4/2013 | Iyer | |
| 2013/0128886 A1 | 5/2013 | Shah | |
| 2013/0132501 A1* | 5/2013 | Vandwalle | H04L 67/104 709/208 |
| 2013/0137399 A1 | 5/2013 | Bari | |
| 2013/0159715 A1 | 6/2013 | Klassen | |
| 2013/0160080 A1 | 6/2013 | Shin | |
| 2013/0160097 A1 | 6/2013 | Dowlatkhah | |
| 2013/0219045 A1 | 8/2013 | Agarwal | |
| 2013/0250771 A1 | 9/2013 | Yu | |
| 2013/0254853 A1 | 9/2013 | Chaturvedi | |
| 2013/0283060 A1 | 10/2013 | Kulkarni | |
| 2013/0301627 A1 | 11/2013 | Chen | |
| 2013/0329725 A1 | 12/2013 | Nakil | |
| 2013/0343388 A1 | 12/2013 | Stroud | |
| 2013/0346629 A1 | 12/2013 | Wang | |
| 2014/0032753 A1 | 1/2014 | Watanabe | |
| 2014/0040338 A1 | 2/2014 | Van Der Sluis | |
| 2014/0040975 A1 | 2/2014 | Raleigh | |
| 2014/0047439 A1 | 2/2014 | Levy | |
| 2014/0129728 A1 | 5/2014 | Alex | |
| 2014/0181933 A1 | 6/2014 | Sanjeev | |
| 2014/0192976 A1 | 7/2014 | Yoon | |
| 2014/0199962 A1 | 7/2014 | Mohammed | |
| 2014/0226478 A1 | 8/2014 | Manuguri | |
| 2014/0241169 A1 | 8/2014 | Collins | |
| 2014/0245014 A1 | 8/2014 | Tuck | |
| 2014/0274000 A1 | 9/2014 | Gosselin | |
| 2014/0286337 A1 | 9/2014 | Dolson | |
| 2014/0301258 A1 | 10/2014 | Belghoul | |
| 2014/0331175 A1 | 11/2014 | Mesguich Havilio | |
| 2014/0344908 A1 | 11/2014 | Rizzo | |
| 2014/0348044 A1 | 11/2014 | Narayanan | |
| 2014/0355520 A1 | 12/2014 | Wallis | |
| 2015/0058876 A1* | 2/2015 | Gasnier | H04L 67/104 725/16 |
| 2015/0065125 A1 | 3/2015 | Patel | |
| 2015/0139230 A1 | 5/2015 | Zha | |
| 2015/0148007 A1 | 5/2015 | Mitchell | |
| 2015/0188919 A1 | 7/2015 | Belton | |
| 2015/0256338 A1 | 9/2015 | Roberts | |
| 2015/0281940 A1 | 10/2015 | Yu | |
| 2015/0304275 A1 | 10/2015 | Ghai | |
| 2015/0372973 A1 | 12/2015 | Lopez Da Silva | |
| 2016/0072766 A1 | 3/2016 | Jain | |
| 2016/0359798 A1 | 12/2016 | Choquette | |
| 2017/0195256 A1 | 7/2017 | Javali | |
| 2017/0250944 A1 | 8/2017 | Hong | |
| 2017/0373961 A1 | 12/2017 | Dolson | |
| 2018/0034770 A1 | 2/2018 | Rajagopalan | |

FOREIGN PATENT DOCUMENTS

| | | |
|---|---|---|
| EP | 1587249 | 10/2005 |
| EP | 1837815 | 9/2007 |
| EP | 1993257 | 11/2008 |
| WO | 2007004938 | 1/2007 |
| WO | 2009103340 | 8/2009 |
| WO | 2013035051 | 3/2013 |
| WO | 2014018425 | 1/2014 |
| WO | 2015066930 | 5/2015 |

OTHER PUBLICATIONS

Ford et. al., Peer-to-Peer Communication Across Network Address Translators, 2005, Usenix.*
"Interface for warrant information Output From LI34 Q & D Li Agnostic;Li(14)P35060_DTS_103_120_-_Output_from_LI_13_Q_D_LI_agnostic", ETSI Draft; LI(14)P35060_DTS_103_120_-OUTPUT_FROM_LI_13_Q_D_LI_AGNOSTIC, European Telecommunications Standards Institute (ETSI), 650, Route Des Lucioles; F-06921 Sophia-Antipolis ; France, (Jan. 28, 2014), vol. LI, No. V0.0.7, pp. 1-53, XP014161420.
Antopolis, Sophia, Universal Mobile Telecommunications System (UMTS) LTE; 3G security; Lawful Interception architecture and functions, version 10A.0., Jun. 1, 2011.
Antopolis, Sophia, "Lawful Interception (LI); Retained Data; Requirements of Law Enforcement Agencies for handling Retained Data", ETSI Draft; Jan. 27, 2009.
International Search Report dated May 21, 2015 in corresponding PCT Application No. PCT/US2015/15490 filed Feb. 11, 2015, inventor Puri, Rajesh et al.
International Search Report dated Jul. 8, 2015 in corresponding PCT Application No. PCT/US2015/016961 filed Feb. 20, 2015, inventor(s) Grootwassink, David, et al. cited by applicant.
Written Opinion of the International Searching Authority dated May 21, 2015, issued in International Application No. PCT/US2015/015490. cited by applicant.
International Search Report dated Oct. 30, 2015, issued in International Application No. PCT/US2015/023626 filed Mar. 31, 2015, inventor, Grootwassink, David et al.
Written Opinion of the International Searching Authority dated Oct. 30, 2015, issued in International Application No. PCT/US2015/023626. cited by applicant.
Written Opinion of the International Searching Authority dated Jul. 8, 2015, issued in International Application No. PCT/US2015/016961. cited by applicant.
International Search Report dated Feb. 2, 2016, issued in International Application No. PCT/US2015/054957 filed Oct. 9, 2015, inventor Hammer, Michael et al.
Written Opinion of the International Searching Authority dated Feb. 2, 2016, issued in International Application No. PCT/US2015/054957. cited by applicant.
International Search Report dated Jan. 28, 2016, issued in International Application No. PCT/US2015/061976 filed Nov. 20, 2015, inventor Puri, Rajesh et al.
Written Opinion of the International Searching Authority dated Jan. 28, 2016, issued in International Application No. PCT/US2015/061976. cited by applicant.
International Search Report dated Jun. 22, 2015, issued in International Application No. PCT/US2015/20755 filed Mar. 16, 2015, inventor Puri, Rajesh et al.
Written Opinion of the International Searching Authority dated Jun. 22, 2015, issued in International Application No. PCT/US2015/020755 cited by applicant.
International Search Report dated Jul. 29, 2016, issued in International Application No. PCT/US2016/030311 filed Apr. 29, 2016, inventor Hammer, Michael et al.
Written Opinion of the International Searching Authority dated Jul. 29, 2016, issued in International Application No. PCT/US2016/030311 cited by applicant.
International Search Report dated Jan. 30, 2017, issued in International Application No. PCT/US2016/061894. cited by applicant.
Written Opinion of the International Searching Authority dated Jan. 30, 2017, issued in International Application No. PCT/US2016/061894 cited by applicant.
International Search Report dated Feb. 3, 2017, issued in International Application No. PCT/US2016/061897 filed Nov. 14, 2016, inventor Hammer, Michael et al.
Written Opinion of the International Searching Authority dated Feb. 3, 2017, issued in International Application No. PCT/US2016/061897. cited by applicant.
Antopolis, Sophia, Interface for Warrant information Output from LI34 Q&D LI Agnostic; vol. LI No. Vo.07, Jan. 28, 2014.
Extended European Search Report dated Feb. 16, 2018 in corresponding EP Application No. 15749222.4 filed Sep. 12, 2016, inventor Grootwassink, David et al.
International Search Report dated Apr. 25, 2017, issued in International Application No. PCT/US2017/17560 filed Feb. 10, 2017, inventor Hammer, Michael et al.

(56) References Cited

OTHER PUBLICATIONS

Supplementary European Search Report dated Feb. 5, 2018 in corresponding EP Application No. 15751839.0 filed Sep. 21, 2016, inventor Grootwassink, David et al.

* cited by examiner

| Round | Message | Plaintext part or Alias | Encrypted Part | Encryption Method |
|---|---|---|---|---|
| 0 | SMS-A | Code A | | |
| 0 | SMS-B | Code B | | |
| 1 | Pkg A1 | A1=SHA-128(Code A) | A2 \| Public – user 401 | AES 256, key=SHA-256(Code A) |
| 1 | Pkg B1 | B1=SHA-128(Code B) | B2 \| Public – user 402 | AES 256, key=SHA-256(Code B) |
| 2 | Pkg A2 | A2=From Pkg A1 | A3 \| Symmetric – A3 | AES 256, key=Public – user 402 |
| 2 | Pkg B2 | A2=From Pkg B1 | B3 \| Symmetric – B3 | AES 256, key=Public – user 401 |
| 3 | Pkg A3 | A3=From Pkg A2 | Defined by Package | AES 256, key=Symmetric – A3 |
| 3 | Pkg B3 | B3=From Pkg B2 | Defined by Package | AES 256, key=Symmetric – B3 |

Figure 7

PEER-TO-PEER RENDEZVOUS SYSTEM FOR MINIMIZING THIRD PARTY VISIBILITY AND METHOD THEREOF

CROSS-REFERENCE TO RELATED APPLICATIONS

The present application claims priority to U.S. Patent Application No. 61/973,072 filed on Mar. 31, 2014, entitled "Peer-To-Peer Rendezvous System To Minimize Third Party Server Visibility," which is herein incorporated by reference.

FIELD

The present disclosure generally relates to network communications and, more particularly, to a peer-to-peer rendezvous system for minimizing visibility by a third party server.

BACKGROUND

Telecommunication systems are built by service providers to connect users who are willing to pay to provide information to one another user. Telecommunication systems have evolved from physical mail systems to telegraph operations, and to telephony systems that are typically operated by a government monopoly known as the Post Telephone and Telegraph (PTT) administrations. Recently, telecommunications are transmitted via a collection of private and public packet networks called the Internet, and via mobile telephony and data networks to connect cellular handsets.

Throughout the history of development of telecommunication networks, governments have worked closely with industry to design and build them. Typically, a grant of use of public lands or airwaves by the government has resulted in reciprocal support of the local governments in the form of taxes and services in the public interest. Nearly all governments consider these telecommunication networks to be an integral part of the local and national infrastructure and require them to support emergency services.

A user may use a telecommunication network to conduct commercial or government business, or share personal information. The user trusts that his/her communication content with another user via the telecommunication network remains private. However, it has recently been publicized that it is not always possible to trust that the intermediate servers or nodes or the network itself has not been compromised by the government, the service providers, or by criminal elements that exploit weaknesses in the technology. To overcome this, direct communications between peers known as peer-to-peer (P2P) secured by strong encryption of transmitted data has been created.

Many applications today are typically Web-based (hypertext transfer protocol (HTTP)-based), run over-the-top (OTT) of a service provider's packet networks, and hence limit their exposure to what is available in low-level packet headers. However, they rely on proxy servers that are operated by third parties to interconnect users. Such solutions shift the nature of the third party from a network operator to an application service provider. A system running a traditional application (e.g., GOOGLE®) is vulnerable to a security issue.

An ideal solution would be to have direct connections between peer applications with no third party servers involved. However, that is stymied by a feature of nearly all networks: network address and port translator (NAPT). NAPT was introduced to enable users on a private side of a network to share limited public Internet Protocol version 4 (IPv4) addresses available to a private or public service provider's network. The NAPT enables sharing (optionally adding security) by opening pinholes for a limited time when a packet is sent from the private side to the public Internet. A pinhole is a temporary assignment of a public Internet protocol (IP) and port number to a communication source private IP/port address. When a pinhole is assigned, a packet from the distant part can traverse the NAPT in the inbound direction. The NAPT can further exhibit a variety of restrictive behaviors.

Mobility introduces another possible security weakness. If both peer applications move simultaneously, their IP addresses may no longer be valid. The peer applications require a mechanism to re-discover their IP addresses of each other. A typical approach is for a peer application to connect to a registry and report an identity of the peer application and a current location or address. With P2P, this approach may be avoided if only one peer application moves at a time and keeps the other peer up to date. But, due to a coverage or inactivity, peer applications may no longer have valid IP addresses for other peer applications.

The Internet Engineering Task Force (IETF) has created solutions to establish connections through NAPT, recognized by the acronyms session traversal utilities for network address translation (NAT) (STUN) and traversal using relays around NAT (TURN). Although initially designed to enable direct real-time transport protocol (RTP) connections between voice over IP (VoIP) user agents, STUN and TURN have since been made more generic. However, they still rely on an existing communication path to share IP and port candidates to boot-strap a direct communications session. Many secure systems today rely on centralized servers to perform a variety of functions that provide a network point at which third-party monitoring can occur. Registrars and proxies provide a potential weak point in the security of a system.

A typical telecommunications system relies on a service provider network to connect two users who wish to communicate by voice, text, video, and/or a file transfer. The service provider network supports the communication between the two users from a network aspect and an application aspect. A conventional telecommunications network such as public switched telephone network (PSTN) does not separate the network aspect and the application aspect; however, a service provider network may create the separation between the network and the application aspect by supporting applications over the Internet Protocol (IP) layer. The network aspect of the communication involves a transmission of a message or a streaming of a file from one user to another user. The application aspect of the communication involves the control and management of the message/file stream and the identities of the users.

Recent telecommunication systems allow network aspect to be operated and controlled by one provider, while the application aspect is operated and controlled by a separate application provider. In this case, the application-related information and the network-related information are split across two operators. The application-related information and the network-related information may be visible to a third party operator or a man-in-the-middle between two users in communication. Systems based on a peer-to-peer (P2P) model move the application aspects to the two communicating user devices. However, most application providers that claim to be P2P often have a third-party server that controls the application information.

The metadata associated with a user and the user device is created and managed by a central authority, typically through a registry of users. The registry of users may contain information that may concern users who wish to have a higher degree of privacy through a true P2P communication with other users.

SUMMARY

A method and system for enabling peer-to-peer (P2P) communication between peers is disclosed. According to one embodiment, a P2P communication system includes a first peer agent serving a first peer, a second peer agent serving a second peer, and a rendezvous server. The rendezvous server updates a first IP address for the first peer agent to the second peer agent and a second IP address for the second peer agent to the first peer agent. The first peer agent and the second peer agent communicate with the rendezvous server by dropping and retrieving a plurality of dead-drop packages. A first dead-drop package of the plurality of dead-drop packages comprises a first alias that is known only to the first peer and the second peer. A second dead-drop package of the plurality of dead-drop packages comprises a second alias that is different from the first alias.

According to another embodiment, a peer-to-peer (P2P) communication system establishes a bootstrap process to enable P2P communication between a first device and a second device. The first and second devices exchange random codes over a first network. A first peer agent of the first device generates a first package based on the random code received from the second device. The first package includes a first encrypted portion including a first identity of the first device and a first key. The first peer agent sends the first package from the first peer agent to a rendezvous server over a second network and retrieves from the rendezvous server a second package sent from a second peer agent over the second network. The second package includes a second identity of the second device and a second key. The first peer agent decrypts the second encrypted portion of the second package using the second random code.

The first peer agent further generates a third package based on the first identity of the first device and the first key. The third package includes a third encrypted portion including a third identity of the first device and a first symmetric key. The first peer agent sends the third package from the first peer agent to the rendezvous server and retrieves a fourth package sent from the second peer agent of the second device from the rendezvous server. The fourth package includes a fourth encrypted portion including a fourth identity of the second device and a second symmetric key. The first peer agent decrypts the fourth encrypted portion of the fourth package using the second identity of the second device and the second key.

The first peer agent further generates a fifth package based on the third identity of the first device and the first symmetric key. The fifth package includes a fifth encrypted portion including a fifth identity of the first device. The first peer agent sends the fifth package from the first peer agent to the rendezvous server and retrieves a sixth package sent from the second peer agent of the second device from the rendezvous server. The sixth package includes a sixth encrypted portion including a sixth identity of the second device. The first peer agent decrypts the sixth encrypted portion of the sixth package using the fourth identity of the second device and the second symmetric key. A transport connection is established between the first peer agent and the second peer agent.

The present system and method enables the two peers to gain successive information, while obsoleting a previous round of information. There is no need for user information registry or a server in the middle. A Man-In-The-Middle (MITM) would need to intercept two networks and respond as quickly as the other side to hijack a bootstrap between two peers.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the various embodiments of the present disclosed system and method and together with the general description given above and the detailed description of the preferred embodiment given below serve to explain and teach the principles of the present disclosure.

FIG. 7 illustrates exemplary communication packages in each round of communication, according to one embodiment.

Figure 1:
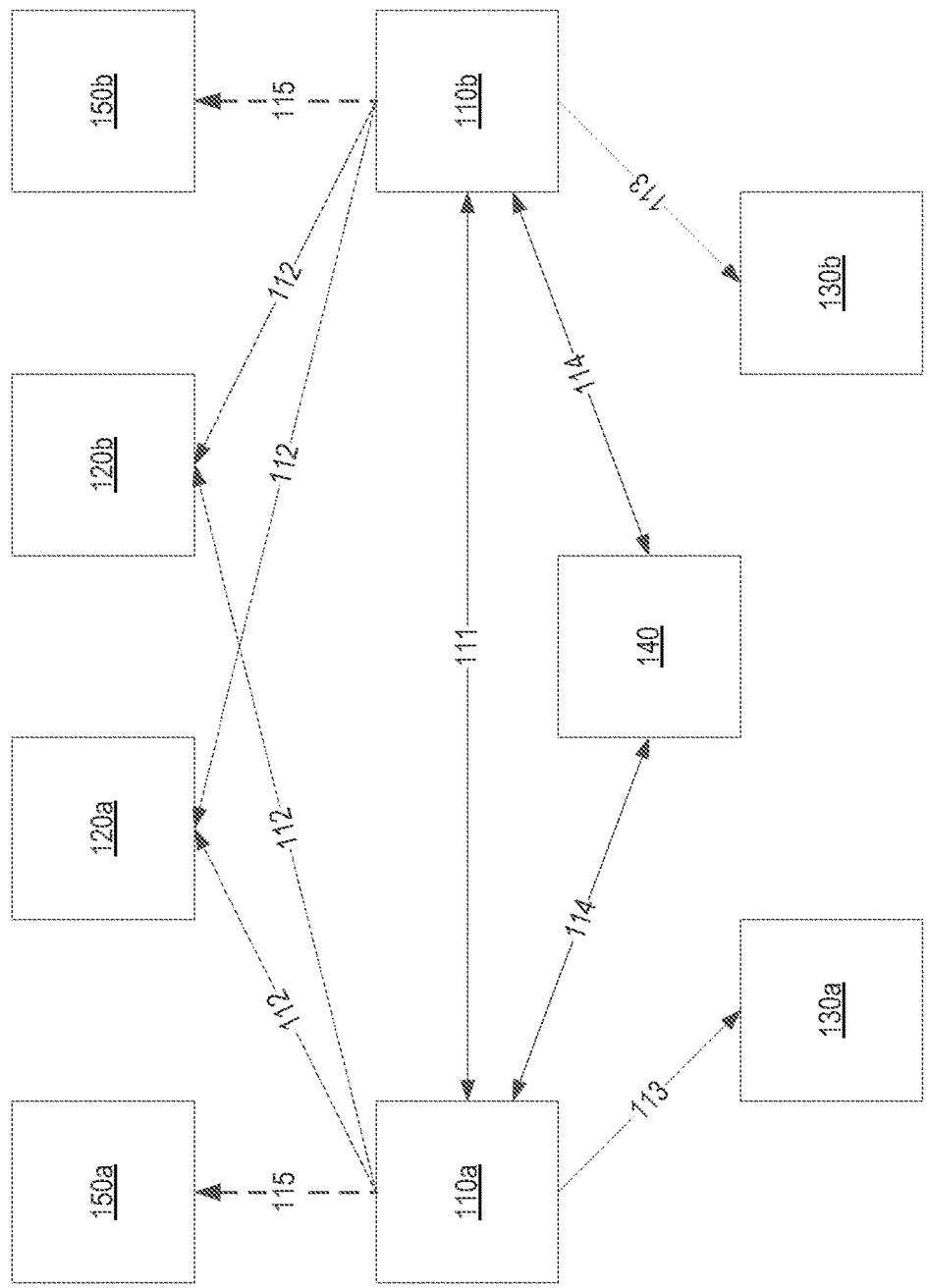
FIG. 1 illustrates a schematic system diagram of an exemplary P2P communication system, according to one embodiment.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

The present disclosure provides a system and method for two or more peer-to-peer (P2P) applications to update a set of information that allows a peer application to recognize when, where, and how to establish direct communications, while minimizing information that is exposed to one or a multitude of third parties such as rendezvous (RV) servers. The information is exchanged between peers as an anonymous and encrypted dead-drop package.

In the following description, for purposes of clarity and conciseness of the description, not all of the numerous components shown in the schematic are described. The numerous components are shown in the drawings to provide a person of ordinary skill in the art a thorough enabling disclosure of the present system and method. The operation of many of the components would be understood to one skilled in the art.

Each of the additional features and teachings disclosed herein can be utilized separately or in conjunction with other features and teachings to provide a P2P communication between peers. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the present disclosure. Therefore, combinations of features disclosed in the following detailed description may not be necessary to practice the teachings in the broadest sense and are instead taught merely to describe particularly representative examples of the present teachings.

Moreover, various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

The present system and method is intended to operate over one or more transport network environments that are either private or public and/or in the presence of one or more NAPT devices on borders between network environments. In one embodiment, these transport networks are packet networks such as Ethernet, IP-based packet networks, frame-relays, packet-switching, or message-switching networks.

The supporting networks are not expected to support the establishment of communications beyond what is necessary to assign endpoint identities, such as IP addresses, via mechanisms such as dynamic host configuration protocol (DHCP). Other standard network mechanisms, such as domain name system (DNS), are expected to support the location of central servers, such as STUN, TURN, RV, and RNG servers. However, nothing precludes the pre-provisioning of the names and public IP addresses of such servers in a user's communication.

According to one embodiment, the present system operates on a peer-to-peer basis directly between end-user client software and devices, such as mobile cell phones/handsets, tablet PCs, and laptop computers. When one peer application connects to another peer application, the peer application updates its current publicly reachable address (e.g., IP and port number) along with additional parameters, such as crypto-keys to be used in a subsequent communication.

FIG. 1 illustrates a schematic system diagram of an exemplary P2P communication system, according to one embodiment. A peer user agent 110a communicates with a STUN server 130a via a path 113 to request a report for a public IP/port number for the peer. The STUN server 130a may be a public or private server or a randomly chosen server. The peer 110a may also connect to a TURN server 140 via a path 114 to request it to assign a public IP/port address on the TURN server 140 to be used by the peer and relay packet traffic sent to the assigned IP/port back to the assigned peer. The TURN server 140 may be a public or private server or a randomly chosen server.

The peer 110a then communicates with another peer 110b that is reachable with the current public IP/port address via a direct communication path 111. If the peer 110b is not directly reachable, the peer 110a may indirectly communicate with an RV server 120a and/or 120b via a path 112 to update the peer with the current IP/port address.

Because there could be multiple layers of networks and NAPT, the peer 110a may acquire multiple IP/port addresses from multiple STUN/TURN servers at different network levels that the other peer could use to reach the peer 110b. The IETF Internet connectivity establishment (ICE) algorithm may be used to determine which IP/port address to be used at the time of connection establishment.

The peer 110a may also connect to a random number generator (RNG) server 150a via a path 115 to fetch batches of random bits that are generated from physics phenomena. In one embodiment, the connection with the RNG server 150 is Web-based and protected by the HTTP secure (HTTPS) protocol. The peer 110a fetches these random bits on a regular, but random basis, independent of when, where, or how those bits are used. In one embodiment, a store of bits is cached and replenished when the store gets low. The usage of any given batch of bits is such that a given application of bits usually spans multiple batches. According to one embodiment, the ensuring algorithm is proprietary.

The present system and method focuses on how the two peers 110a and 110b update one another through a connection 112 using one or more RV servers 120a and 120b when direct communications between the two peers 110a and 110b cannot be established due to obsolete addresses. The present system and method minimizes any information leakage to an RV server, or any third party that might monitor the communications between the peer and the RV server. In one embodiment, IP/port addresses may become obsolete due to loss of NAPT pinhole assignments or through mobility when one or both handsets move to a new network location.

The present system and method supports both a contact bootstrap process whereby two peer applications establish an initial contact with each other, and a contact update process whereby one or more parameters needed to re-establish connections are provided to the remote peer application. The RV server can also support indications of status between the peers and indications of whether a connection is needed at a moment. The contact bootstrap process is explained in further detail below.

The present disclosure supports the concept of a dead-drop package, whereby an unknown entity drops an unknown package at an unknown time at an unknown location, where a second entity who knows the above unknowns can asynchronously pickup the package and use it. Both prior and after the transfer of the package, there is no state information maintained. During the transfer, the package is encrypted. The only information that may be detected is the IP source of the two parties dropping and picking up the package. Such sources may be hidden by a mechanism such as an onion router (TOR) network or an anonymity network.

Existing secure network solutions typically involve a third party that may or may not be known to the peers. Traditional systems, such as VoIP and IP multimedia subsystem (IMS), require the use of registration and service proxies (proxy-call session control function (P-CSCF) and serving CSCF (S-CSCF)) that aid in connectivity through firewalls and routing of signaling to support setup of secure media paths. However, the signaling itself reveals much information about the communicating parties. Systems such as SKYPE® use super-nodes and other peer applications discovered through distributed hash tables (DHT) to setup connectivity. Other systems, such as SILENT CIRCLE®, involve the registration with a central server that is conveniently located in countries deemed friendly to privacy. Such systems may reveal who the customers are, where they are, and when they communicate. Unlike a home location registrar (HLR) or home subscriber server (HSS), the RV server does not maintain any user profiles or records of each user. In effect, it is just a public or private location where a dead-drop package can occur. The only information exposed is ephemeral target aliases from arbitrary and changing IP addresses.

A minimum of one RV server is required, but multiple RV servers may be accessed, where no server has a relationship with any user. So, a client (i.e., a peer user agent) may use any RV server. The peer user agent 110a picks one or a set of RV servers (e.g., 120a and 120b) to use and communicates the picked RV server(s) to a peer application prior to using the RV server(s).

When a remote peer application is lost, each peer application refers to the RV servers associated with a particular peer application for an encrypted package that is targeted to that particular peer application. If a peer application finds a package, it downloads the package, decrypts, and extracts the payload. In one embodiment, this provides the IP address candidates of the lost peer. The peer application that finds the package attempts to contact the lost peer application and re-establish its association with the lost peer application. If no package is present, a peer application constructs an encrypted package for that peer and drops the package on the RV server. The only information exposed to the server is the peer application's random alias identity.

In one embodiment, the alias on the package dropped may identify the sender. In another embodiment, the alias on the package dropped may identify the recipient. A peer search algorithm may be used to determine whether a peer application searches for its own alias or a remote alias.

The alias is known only to the two peer applications involved. Each peer application identifies itself to the other peer application with a different random identity. This prevents two peer applications from colluding with each other and discovering that a peer that is associated with each of the two peer applications is the same peer application. This also prevents the use of an identity with one peer application from affecting the security of an identity with another peer application. The aliases are created and exchanged during prior communications. Each peer application updates the other peer application with new aliases. In one embodiment, the alias is updated after each exposure to the RV server, with confirmation from the remote peer application that the update has been received. In another embodiment, the alias may be changed periodically to limit potential traffic tracking due to compromised packets.

Each peer application removes its own package once the remote peer application has contacted it and a new association has been established. The peer sends a message to the RV server using a handle identity provided by the RV server when it is dropped. In one embodiment, the RV server may have a global max time-to-live timer, and after the time expires, packages are removed from the server. In another embodiment, packages may have a sender specified time-to-live, after which the RV server may delete the package.

To minimize attackers having knowledge of what packages are present on an RV server, the RV server responds only to specific named requests from peer applications. In one embodiment, the present system restricts the number of requests made from a given source over a given timeframe, in essence slowing a brute-force attack.

Figure 2:
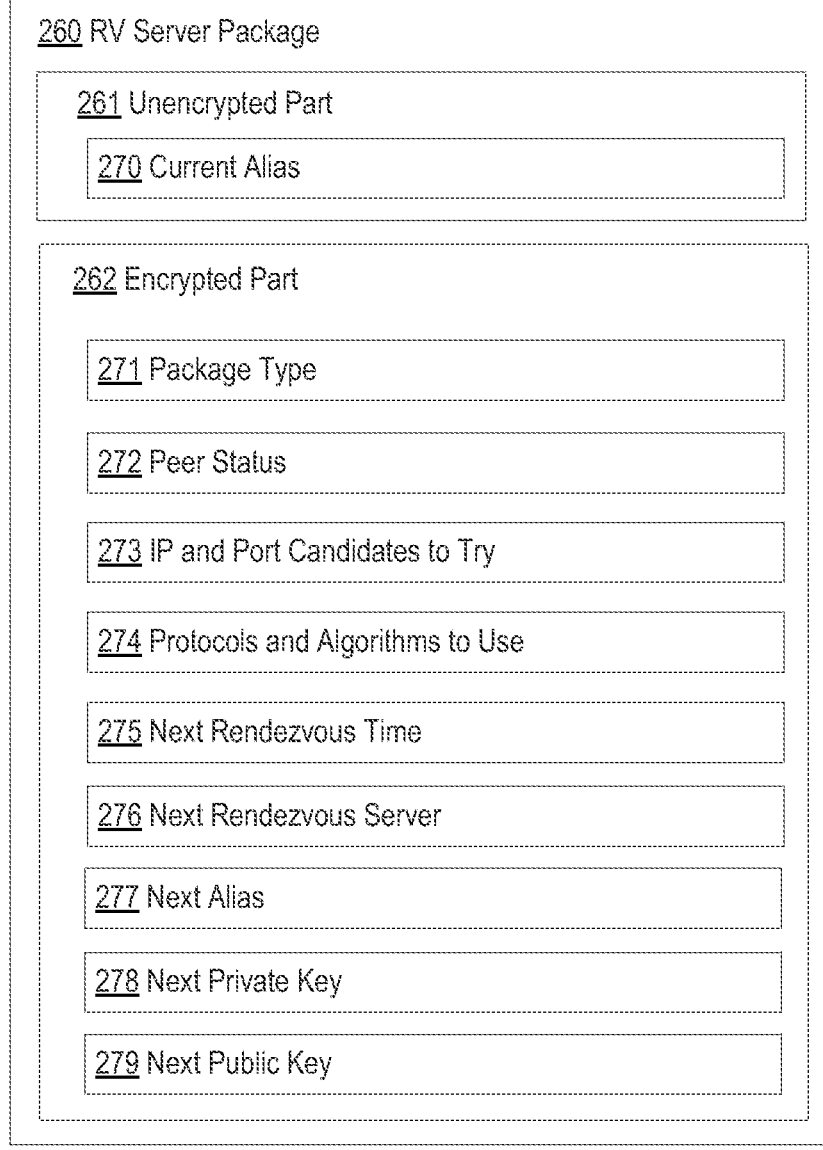
FIG. 2 illustrates an exemplary data structure of an RV server package, according to one embodiment.

FIG. 2 shows an example embodiment of an RV server package, according to one embodiment. The RV server package 260 may also be referred to as a drop-dead package. The RV server package 260 contains both a part that is unencrypted 261 and a part that is encrypted 262. Current market solutions often include various encryption parameters, such as explicit identification of algorithms or an index to point to associated keying data. For the present system, such elements are pre-negotiated and not provided in the unencrypted part of the dead-drop package.

The key parameter in the unencrypted part 261 of the package 260 is the alias 270. An alias is a string of random bits. In one embodiment, an alias is 128 bits encoded as hex characters (0-9, a-f). In one embodiment, the present system may use a different number of bits, and may use a different means of representing random bits. The important characteristic is that aliases are random and difficult to guess by using a brute-force trying approach of all combinations. Pseudo-random values may be used, but may then have reduced security. Other parameters may be included in unencrypted 261, such as the time-to-live parameter mentioned earlier. Such elements typically are for the RV server to utilize when caring for the package.

The encrypted part 263 includes parameters that must be only visible to the remote peer application. The package type 271 is intended to identify the purpose of a given package, since packages may contain many permutations of parameters grouped into related sets. Examples of such sets include sets for sharing network addressing information, such as IP and port 273, sets for sharing next alias 277 and peer status 272, sets for sharing encryption-related data, such as protocols and algorithms 274, next private key 278, and next public key 279, sets for sharing RV server utilization planning, such as next rendezvous time 275 and next rendezvous server 276. Just as the alias is changed after each exposure to the RV server, the keying material used to encrypt packages dropped on the RV server is also changed. Peer applications provide advance delivery of such keying during direct P2P or indirect RV server delivery of communications.

In addition to changing which and what is searching for a dropped package, the question of when and where of searching for dropped packages is also established in advance. Since one RV server represents a single point of failure and attack, the present system uses many RV servers in a non-deterministic manner. Dispersal across several RV servers, potentially in many countries, magnifies the resources required by an attacker. Because the RV server role is minimized, it is possible to deploy many of them.

Each time a package is dropped, the dropped package may be on a different RV server. The present system provides hopping among the RV servers akin to the frequency-hopping among frequencies used by secure radios. Each peer application uses random numbers as inputs to an algorithm to select a sequence of RV servers to use. Peer applications coordinate to establish the sequence of servers to use and when to switch from one RV server to the next. In one embodiment, a new RV server is used after each successful package exchange. However, agreement on when to move to the next RV server, when RV servers are out of service, fail, or simply based on time intervals may be used in various embodiments.

Figure 3:
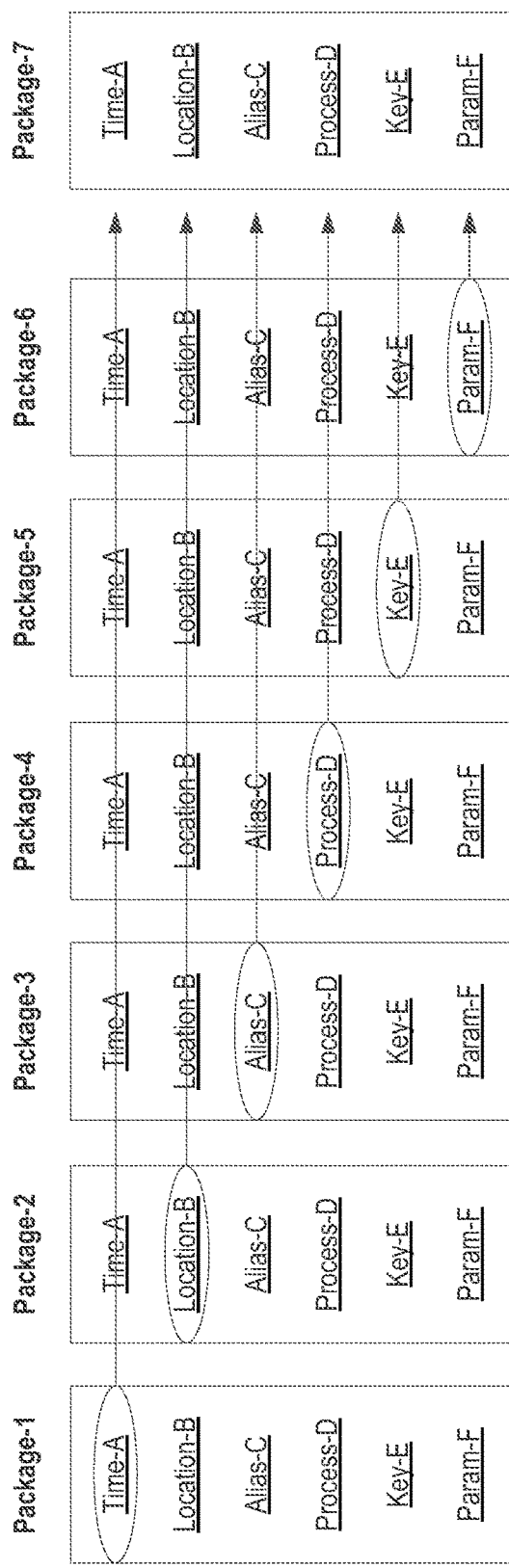
FIG. 3 illustrates a series packages exchanged between two peers, according to one embodiment.

The present disclosure describes how multiple parameters (e.g., alias, encryption, timing, RV server) must be known in advance to intercept a package. Such information may be striped across multiple prior packages or communications. FIG. 3 illustrates a series packages exchanged between two peers, according to one embodiment. The packages are exchanged in a series to securely send the multiple parameters such as time, location, alias, process, key and other parameters. To intercept and open package 7, packages 1 through 6 must be compromised. A compromise of a single package is insufficient to intercept a subsequent package.

To minimize information leaked through traffic analysis, where just observing package sizes might reveal something, padding techniques are used to make all packages look identical. Certificates can potentially reveal information about the client. According to one embodiment, the present system generates and uses anonymous certificates with locally generated random identities and public keys. The client interface uses nicknames provided by the local user so that the local graphical user interface (GUI) can represent peer buddies in a human readable form. However, these local names are never sent onto the network in any message.

The security of a key also depends on the key being secret and held only by parties that should have the key. According to one embodiment, the keys are stored only on the peer machines. There is no key escrow, so there is no server in the system that also has the keys. Server keys are only used in cases where the server must authenticate itself or secure communications with itself and a peer application. Also, all data on peer machines is encrypted by a password known only by the end-user.

According to one embodiment, the present system establishes a peer-to-peer (P2P) communication and minimizes third party server visibility of information related to the peers through an electronic equivalent of a dead-drop. In one embodiment, the present system employs multiple layers of interconnected supporting transport networks. The multiple layers of network address and port translator (NAPT) are traversed between the two peers. In one embodiment, the present system uses multiple arbitrary STUN servers to determine the IP addresses of the two peers. In another embodiment, the present system uses multiple random TURN servers to interconnect network paths between the two peers.

The present system may further comprise a plurality of arbitrary random number generator (RNG) servers, wherein the RNG servers create random binary bit streams that are accessed to build an on-peer store of random bits, generate aliases, encryption keys, and other random-based parameters, and select servers. In one embodiment, the random binary bit streams are decoupled from an application of random bits for a particular purpose, because the set of bits selected spans RNG server response messages and is asynchronous between the acquisition and application. In another embodiment, the random binary bit streams are never re-used. An initial boot-strapping of peer identities is supported.

The two peers can discover, create, and exchange key parameters such as IP addresses, ports, and cryptographic parameters, needed by the two peers to establish direct network connectivity without an aid of intermediate application servers or proxies. The dead-drop acts as an alternate communication path when direct network connectivity between the two peers is lost.

According to one embodiment, the present system generates anonymous certificates for public key on the two peers without using PKI infrastructure. The present system prevents the transmission of locally entered nicknames of the two peers over a network. The keys are generated and shared solely between the two peers and are not escrowed on a third party server. An application and its data are encrypted on a peer client by a password known only to an end-user.

According to one embodiment, the present system comprises one or more rendezvous (RV) servers that perform the dead-drop of a uniformly non-descript package between the two peers. The two peers may non-deterministically hop among RV servers with successive packages dropped. In that case, the present system controls a time when the next RV server in a sequence is used, and it may occur every drop or every successful drop and pickup. There is no subscription relationship between the two peers and an RV server, and there are no registries of the two peers. The drop-off and pickup of a package does not require the two peers to be connected to the RV server simultaneously.

The order of the next subset of RV servers to be used between the two peers is randomly chosen. The RV servers are dispersed across multiple networks and geographies. A peer supports one-time use of an RV server. RV servers are dynamically created and destroyed, and the naming and addressing of specific RV servers is decoupled via the use of domain name servers (DNS) or equivalent registries to map names to addresses. The RV server stores packages for only a limited time and does not maintain any logs. The RV server allows only package dropper to determine, either via an explicit delete message with RV server generated handle or a package timer, when to delete a package.

The RV server only allows downloads by a peer who knows the alias. A request to download packages may contain multiple aliases. The rendezvous time between peers is randomly chosen and pre-arranged between the two peers. The two peers asymmetrically use disjoint sets of RV servers to exchange packages such that peer one drops a package on RV server-X while peer two drops another package on RV server-Y. The information needed to successfully pick-up a package and decode the package are pre-arranged. The information needed to successfully retrieve and decode a package includes an alias, a package encryption key, an RV server location, a time of the RV server drop, a package type, and other parameters supporting encryption. The information is pre-arranged across multiple packages and exchanged between the two peers such that a single package does not contain all the information and striped across packages.

According to one embodiment, the two peers use an anonymity network (e.g., TOR) to hide their IP addresses. When a uniform non-descript encrypted package is dropped, packages are padded to achieve a uniform size to minimize traffic analysis. The packages have encrypted and unencrypted parts. The unencrypted part reveals no information about the peer, and the package discriminator is a random, statistically unique alias and potentially a timer for the lifetime of the package.

The encrypted part contains an indication of status of the presence of a remote peer. The encrypted part may contain 1) the current set of IP addresses and ports to directly connect to the remote peer, 2) the next sequence of aliases to be used with the remote peer, 3) the next sequence of RV servers to search, 4) the next sequence of times to search an RV server, 5) the next sequence of encryption keys to decrypt packages, 6) the next public key to use for a remote peer, and/or 7) the next cipher suite to use for decrypting a package, 8) the next set of cipher parameters to use for decrypting a package, such cipher parameters including salt, initialization vectors, etc. The key used to encrypt the current package is changed after each use or exposure to the RV server. The key used to encrypt the current package is changed after a pre-arranged period of time.

The information needed to establish communication with a peer is carried in the encrypted part including who, what, when, where, why, and how such as an algorithm, an index, a salt, etc. According to one embodiment, a string of random bits from the RNG server is of length 128 and is encoded as hex characters or pseudo-random generated locally. The alias is changed each time it is exposed for a particular package on the RV server. In one embodiment, the alias is changed based on a pre-arranged period of time. The alias identifies a package sender or receiver, and different aliases are used for different remote peers.

The present system and method uses a contact bootstrap process to enable two peers to securely build a set of data to communicate directly with each other without sharing private information with a third party. The present system and method allows peers to communicate with other peers without sharing their identities or any knowledge of user-specific information.

According to one embodiment, a P2P communication system includes a first peer agent serving a first peer, a second peer agent serving a second peer, and a rendezvous server. The rendezvous server updates a first IP address for the first peer agent to the second peer agent and a second IP address for the second peer agent to the first peer agent. The first peer agent and the second peer agent communicate with the rendezvous server by dropping and retrieving a plurality of dead-drop packages. A first dead-drop package of the plurality of dead-drop packages comprises a first alias that is known only to the first peer and the second peer. A second dead-drop package of the plurality of dead-drop packages comprises a second alias that is different from the first alias.

According to another embodiment, a peer-to-peer (P2P) communication system establishes a bootstrap process to enable P2P communication between a first device and a second device. The first and second devices exchange random codes over a first network. A first peer agent of the first device generates a first package based on the random code received from the second device. The first package includes a first encrypted portion including a first identity of the first device and a first key. The first peer agent sends the first package from the first peer agent to a rendezvous server over a second network and retrieves from the rendezvous server a second package sent from a second peer agent over the second network. The second package includes a second identity of the second device and a second key. The first peer agent decrypts the second encrypted portion of the second package using the second random code.

The first peer agent further generates a third package based on the first identity of the first device and the first key. The third package includes a third encrypted portion including a third identity of the first device and a first symmetric key. The first peer agent sends the third package from the first peer agent to the rendezvous server and retrieves a fourth package sent from the second peer agent of the second device from the rendezvous server. The fourth package includes a fourth encrypted portion including a fourth identity of the second device and a second symmetric key. The first peer agent decrypts the fourth encrypted portion of the fourth package using the second identity of the second device and the second key.

The first peer agent further generates a fifth package based on the third identity of the first device and the first symmetric key. The fifth package includes a fifth encrypted portion including a fifth identity of the first device. The first peer agent sends the fifth package from the first peer agent to the rendezvous server and retrieves a sixth package sent from the second peer agent of the second device from the rendezvous server. The sixth package includes a sixth encrypted portion including a sixth identity of the second device. The first peer agent decrypts the sixth encrypted portion of the sixth package using the fourth identity of the second device and the second symmetric key. A transport connection is established between the first peer agent and the second peer agent.

According to one embodiment, the present system and method generates a secure buddy list via several phases of learning and across several modes of communications. The generation of the secure buddy list minimizes the use of knowledge or tracking of user specific information except the exchange of a code based on the telephone number over an alternative network. In one embodiment, the present system and method provides a rendezvous (RV) server to bootstrap the P2P communication between two peers. The RV server acts as a network medium that only sees packages being exchanged whereas an application of each user device is a party that sees the content within the packages and knows the alias of the other peer who drops and picks up the packages.

Figure 4:
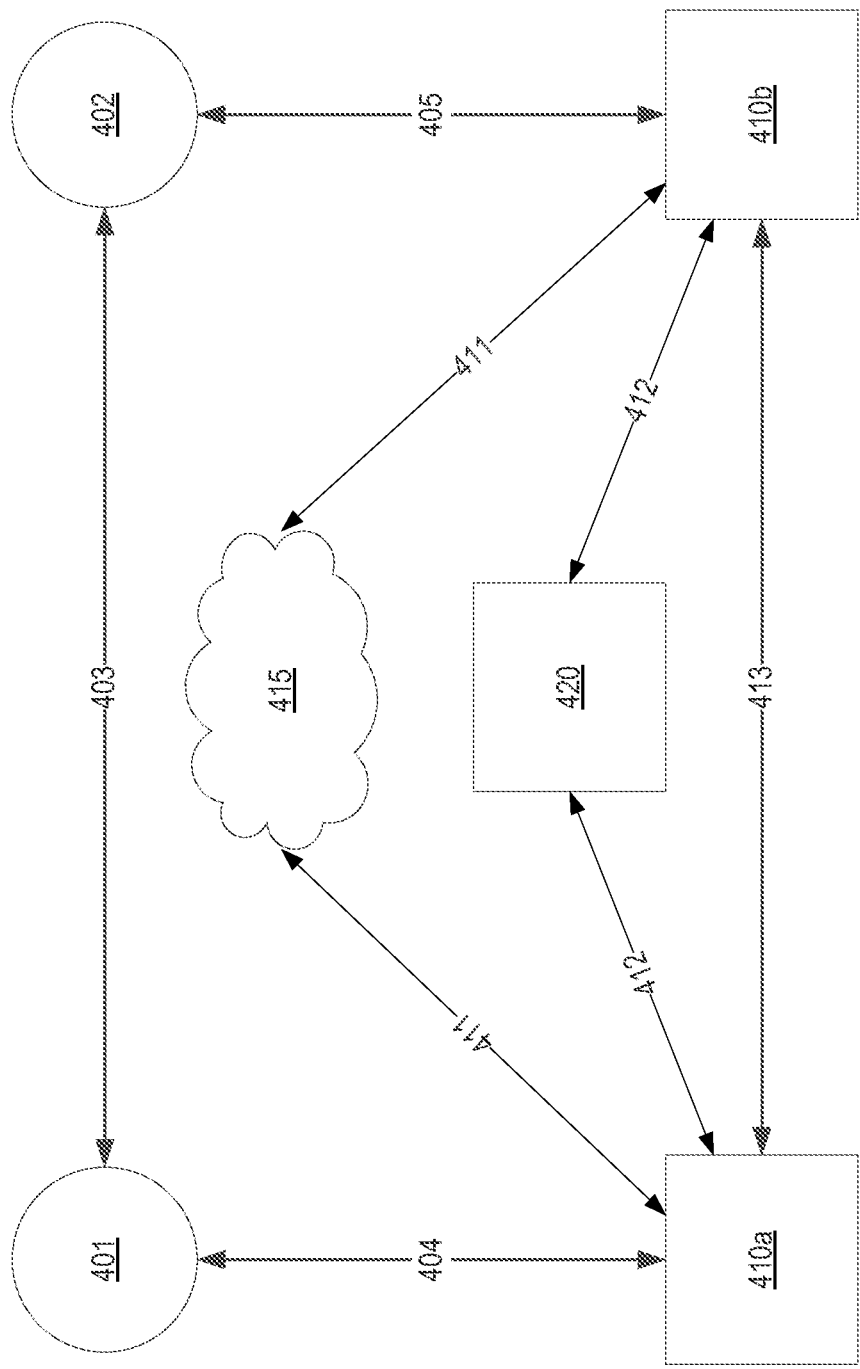
FIG. 4 illustrates a schematic system diagram of another exemplary P2P communication system, according to one embodiment.

FIG. 4 illustrates a schematic system diagram of an exemplary P2P communication system, according to one embodiment. Two users 401 and 402 wish to add each other as a contact in a P2P application. The users 401 and 402 can communicate face-to-face (F2F) via a path 403 or enter information via graphical user interfaces (GUIs) 404 and 405 into their respective applications on peer user agents (UAs) 410a and 410b. For example, two users 401 and 402 are in the same room seeing each other's face, and the user 401 reads a code from an application running on his phone, and user 402 types the code into his/her application. The alternate network 415 may be established using an anonymous phone call, an email not associated with the user's phone, or any other information conveyance manner.

According to some embodiments, the peer user agents 410a and 410b communicate with each other via three communication paths. The first communication path 411 is through an alternate network 415. The second communication path 412 is through a rendezvous (RV) server 420. The third communication path 413 is a direct P2P communication between the peer user agents 410 over a transport network, such as an IP network. The first and second communication paths 411 and 412 may involve an application-layer element (e.g., P2P application) whereas the third communication path 413 does not.

According to one embodiment, the peer UAs 410a and 410b are a monolithic handset running an application. However, it is apparent to one of ordinary skill in the art that the peer UAs 410a and 410b could encompass multiple devices and/or multiple applications on one device that support different modes of communication. For example, the path 411 through application network 415 may be a voice telephony application/network, a short message service (SMS) application/network, a text application/network (e.g., pager), and a video application/network.

Figure 5:
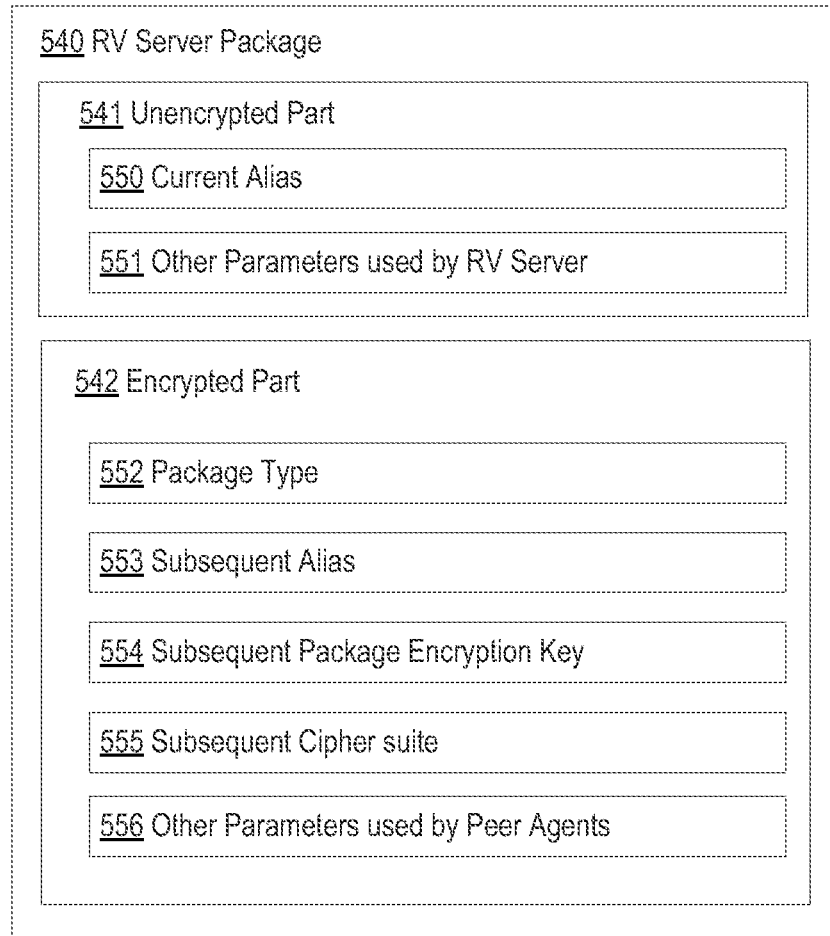
FIG. 5 illustrates another exemplary data structure of an RV server package, according to one embodiment.

FIG. 5 illustrates an exemplary data structure of an RV server package, according to one embodiment. A peer user agent sends an RV server package 540 to an RV server. The RV server package 540 includes an unencrypted part 541 and an encrypted part 542. The unencrypted part 541 includes an arbitrary random identity for a current alias 550 and other parameters 551 intended for the RV server to use. The encrypted part 542 includes a package type 552, a subsequent alias 553, a subsequent package encryption key 554, and a subsequent cipher suite 555, and other parameters 556 used by the peer agents. The cipher suite 555 refers to a description of an encryption algorithm and a size of a key used in the encryption algorithm, for example, Advance Encryption Standard (AES) versus Data Encryption Standard (DES), a 256-bit key versus a 128-bit key, and Secure Hash Algorithm (SHA) versus of a Hash-based Message Authentication Code (HMAC). The other parameters 556 may include various information used the peer agents, for examples, identity of an RV server to drop and pick up packages. The package type 552 distinguishes the package variations to progress through the bootstrap phases. The subsequent alias 553 is the identity used by the peer to identify the user and the packages. The subsequent package encryption key 554 is used to encrypt the packages and change in each phase of the bootstrap process. The subsequent cipher suite 555 may also change with each phase of the bootstrap process.

According to one embodiment, an additional round of exchanged dropped packets is used to negotiate the ciphersuites to be used in subsequent rounds. Such parameters can also be combined with other exchanged parameters within the same package. That is, each set of parameters used to pre-provision a given feature between the peers may be orthogonal, and can be updated together or apart and independently of the other feature parameters.

Figure 6:
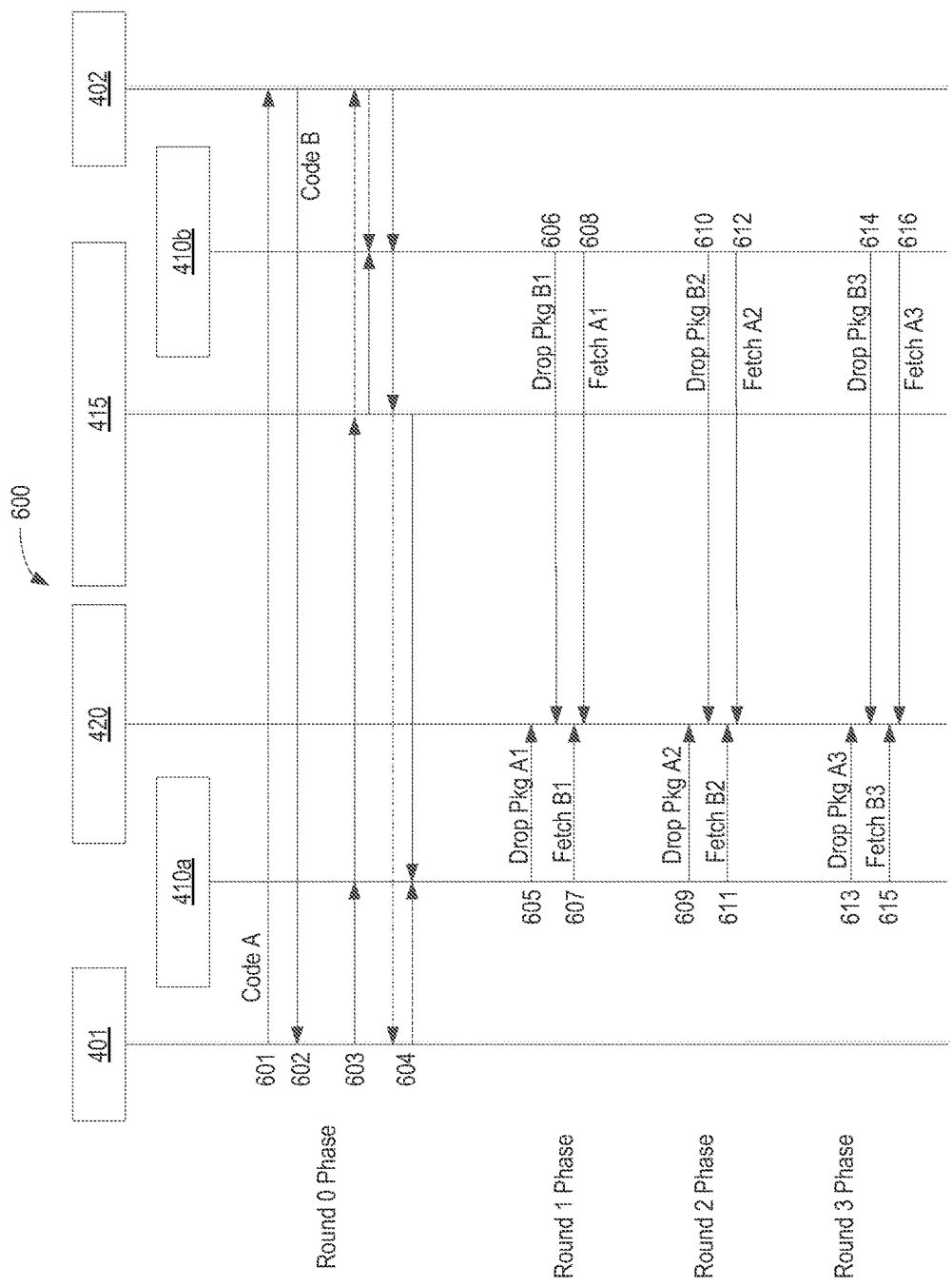
FIG. 6 illustrates an exemplary sequence diagram of an exemplary P2P system, according to one embodiment.

FIG. 6 illustrates an exemplary sequence diagram of an exemplary P2P system, according to one embodiment. The sequence diagram 600 is also referred to as a ping-pong diagram or a ladder diagram. The network entities allowing a communication between the users 401 and 402 include the peer user agents 410a and 410b, the RV server 420, and the application network 415. The vertical line associated with each network entity indicates a starting point or an ending point of communication as represented by the direction a horizontal arrow. The annotation on the horizontal arrow identifies the content of the communication. Time progresses from the top to the bottom of the sequence diagram 600.

The user 401 initiates communication with the user 402 by sending code A to the user 402. In response, the user 402 sends code B to the user 401. According to one embodiment, the users 401 and 402 communicate with each other in several rounds of communication phases, namely round 0 phase, round 1 phase, round 2 phase, and round 3 phase. The communications for round 0 phase include two options to pass codes A and B between the users 401 and 402. The first option is face-to-face communication indicated by communications 601 and 602. The second option indicated by communications 603 and 604 uses an intermediate application network 415.

The communications 603 and 604 depict how the users 401 and 402 enter the code into their respective peer user agents 410a and 410b. A dotted line between a user and a network entity indicates that the corresponding communication may involve a separate device or a separate application running on the same device that runs the P2P application, and the user manually enters the code into the P2P application. A solid line indicates that the separate application and the P2P application are running on the same device such that the P2P application can transfer a code to itself directly and/or automatically from the application where the code is received. It is noted that the application/network used in each direction does not have to be the same (or symmetric) application/network. For example, communication 603 is via telephone, while communication 604 is via an SMS message.

The next two sets of communications including the round 1 phase (605-608) and the round 2 phase (609-612) provide a bootstrap process by the RV server 420 by exchanging packages A1, B1, A2, and B2. It is noted that the packages A1, A2 and B1, B2 may include instructions on how the peer should use different RV servers in each subsequent phase. The sequence of RV servers may be identified in other parameters 556 in FIG. 5. Each package contains a randomly generated alias, and the content in the package is encrypted and has a varying length. The encryption scheme and content of the packages may differ from each subsequent package. When a package is dropped, to the RV server 420, the package carries the information of the next alias and the encryption key. To a third party, these bootstrap packages (e.g., A1, B1, A2, B2, A3, and B3) contain a random series of bits of varying length and appear to be no different from other packages received by the RV server 420. So, the RV server and network nodes on the path do not know the identity of a party who dropped a package, the content in the package, or the type of package, or whether two packages (e.g., A1 and B1, A2 and B2, A3 and B3) are related.

According to one embodiment, the bootstrap package represented by round 3 phase (613-616) supports other process, such as a contact connect process versus an add contact (bootstrap) process. The add contact process initially creates a buddy. Thereafter, the peers can bypass the RV server and talk directly. When a peer needs to find a contact again, a contact connect process using other package types on the RV server enables two peers to rediscover their IP addresses and ports. Once the two peers learn reachable IP/port address, they can resume a direct P2P communication. The distinction between the packages A1, A2, and A3 is contained inside the encrypted part of the package.

FIG. 7 illustrates exemplary communication packages in each round of communication, according to one embodiment. In round 0, an alternate network may be used to convey the codes A and B, for example, via an SMS message over a mobile phone. The alternate network refers to a separate network (e.g., a telephone network) from the network where the P2P communication occurs (e.g., the Internet). In one embodiment, the code is a random number generated by a P2P application and displayed to the user. Because the users have no prior crypto-credentials, the code must be sent in a clear but over an out-of-band (to the P2P application) method. In an out-of-band communication, a path taken by a signaling is not the same as a signaling of a media setup by the signaling. For example, telephony signaling goes over a Signaling System No. 7 (SS7) packet network, while a voice path goes through circuit switches.

In round 1, the code is used as an input to generate both an alias and an encryption key to protect the content of packages A1 and B1. Other input variables may be used or other input variables may be combined with the code to generate the alias and the encryption key. Packages A1 and B1 in round 1 are used to exchange a public key (i.e., locally generated credential) and an identity (alias) to be used by the other peer user agent in a subsequent round. In one embodiment, the communication in round 1 expires after a predetermined time (e.g., five minutes). In addition, the RV server or a fetching party could delete the package that contains the code to avoid an unauthorized party, or an MITM, from picking up and misusing the code.

In round 2, the public keys of the peers of round 1 are used to secure the packages A2 and B2. The communications convey the next set of aliases and symmetric (i.e., shared and secret) keys used for the subsequent packages in round 3.

In round 3, the exchanges of packages A3 and B3 through the RV server establish a transport connection to enable P2P communication (e.g., chat, voice, video application) between the two peers. Such P2P communication confirms that the public keys established belong to an intended user, not to an MITM. The user may use the public key confirmation to accept or discard newly created contacts established from the P2P communication. The subsequent transport connection between the first peer agent and the second peer agent bypasses the rendezvous server.

The present system and method operates over one or more transport network environments that are either private or public and in the presence of one or more network address port translation (NAPT) devices on borders between the network environments. These networks include, but are not limited to, an Ethernet or IP-based packet network, a frame-relay network, a packet-switching network, or a message-switching network.

Referring to FIG. 4, the networks supporting paths 412 and 413 are not expected to establish communication beyond the assignment of endpoint identities, such as IP addresses of the peer user agents, via a network protocol such as dynamic host configuration protocol (DHCP). Other standard network entities, such as a domain name server (DNS), are expected to support the location of the central servers, such as an RV server. However, it is understood that the names and public IP addresses of such servers may be pre-provisioned in a user device.

The present system and method bootstraps a user device, such as a mobile phone, a handset, and a laptop, with identities, encryption keys, and other initialization parameters so that the user device can communicate securely with an RV server or on a peer-to-peer basis directly with another user device. The present system and method does not rely on pre-provisioning of identities or crypto-credentials, such as a password or a public key infrastructure (PKI) certificate generated and controlled by a third party.

The present system and method uses a random-number-based code generated by a peer user agent and transmits the code to another peer over an alternate communication network. In one embodiment, the code may be passed using a face-to-face application in a known secure environment. The present system and method provides a choice of an alternate communication network and time expiration to minimize the chance of a third party to intercept the code as well as the subsequent P2P application communication. For example, the alternate communication is via another user's phone or a public telephone. The present system allows the code to be used once and discarded after a limited time.

The present system and method is based on various methods of exchanging the code for example, by a telephone call, an SMS, a text message, a social media, a video, or an encrypted file transfer. The alternate methods for exchanging the code ensures that the intended user device receives the code, for example, through an association with a phone number or other identity, without tainting the P2P application with a traceable connection to the alternate method.

The present system and method uses two parallel symmetric unidirectional processes and establishes a peering relationship, thus discouraging an attack by an MITM to intercept the code and the subsequent communications. Because of the changing nature of the anonymous identities and the present bootstrap process, suspicious contacts can be discarded and new contacts are generated as needed. For example, two peers communicate via an SMS or a phone call on an alternate network and can observe and comment on the bootstrapping progress. During the bootstrapping process, the two peers can confirm with each other via a text message whether they are securely connected to each other. If one peer confirms an establishment of a connection from an application while the other peer does not, their communication may be intercepted by a third party. In this case, they can start over the bootstrapping process. The whole bootstrapping process may be completed in a couple minutes.

The present system and method transitions the two peers through an incremental build of security dependencies. As the P2P application moves from round 0 to round 1, the users exchange the peer-generated public keys, and subsequently exchange shared encryption keys protected by those public keys.

According to one embodiment, the present system and method may be built on other encryption schemes. Examples of such encryption schemes include, but are not limited to, Secure Hash Algorithm (e.g., SHA-1, SHA2), Advance Encryption Standard (AES) (e.g., AES-128, AES-256), Transport Layer Security (TLS) 1.1 or higher, elliptic curve cryptography, and asymmetric PKI. The present system and method uses key strengths depending on the type of encryption scheme. This system minimizes the re-use of symmetric keys by continually updating them via packages or through direct P2P communications.

According to one embodiment, the bootstrap code is a 12-digit random alphanumeric key used once when adding a buddy to the list. An alias and a key that are generated based on the bootstrap code are discarded once they are used.

According to one embodiment, the round 1 packages A1 and B1 are valid for a short period of time, for example, 5 minutes. It is understood that a shorter or longer expiration time can be used without deviating from the scope of the present disclosure.

The public/private key pairs help each peer to verify through signatures. The private key is used to add a digital signature that any user with the corresponding public key can verify. The public key is used to encrypt a package that only the holder of the private key can decode. The first package that each party sends to the other party contains the public key. Subsequent packages are signed proving that only the person who previously sent the public key could provide a subsequent package. This verification process using the public/private key pairs prevents an MITM from intercepting and misusing a package. The sender of a specific package owns the private key associated with the exchanged public key. This can be further enhanced by the P2P application to generate a separate public/private key pair for each peer.

The present system and method uses keys that are stored on user devices. According to one embodiment, the present system and method does not include a key escrow entity, and does not require a server to generate and maintain the keys. In addition, all data on a user device is encrypted by a password known only by the user.

The present system and method updates the aliases in each round and enforces a limited time of the packages to produce a vanishing trail. Hence, the bootstrap process transitions to a secure state that cannot be followed by an MITM.

In one embodiment, the aliases and symmetric encryption keys are based on random numbers generated by sampling of physical phenomena. In another embodiment, pseudo-random numbers are generated based on a platform-provided algorithm. The aliases and symmetric encryption keys may be 128 bits or 32 hex characters. It is apparent to one of ordinary skill in the art that shorter or longer bits or hex characters can be used without deviating from the scope of the present disclosures.

According to one embodiment, the present system allows a peer user agent to identify itself to another peer user agent with a different random identity. This prevents a first peer user agent and a second peer user agent from colluding with each other to discover if a third peer user agent that is communicating with the first and second user agents is the same. This also prevents the use of an identity with one peer user agent from affecting the security of the identity with another peer user agent.

Figure 8:
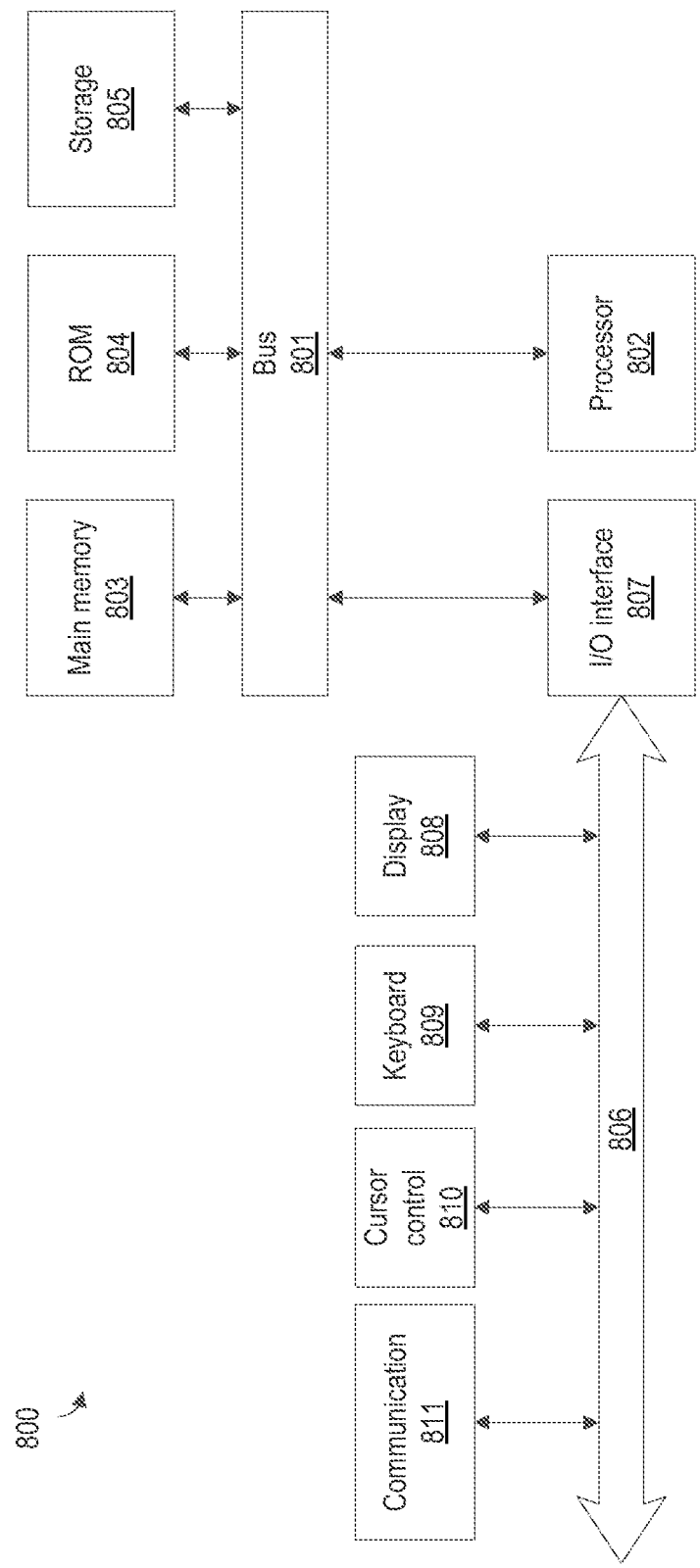
FIG. 8 illustrates an exemplary computer architecture that may be used for the present system, according to one embodiment.

FIG. 8 illustrates an exemplary computer architecture that may be used for the present system, according to one embodiment. The exemplary computer architecture may be used for implementing one or more components described in the present disclosure including, but not limited to, the present content curation system. One embodiment of architecture 800 includes a system bus 801 for communicating information, and a processor 802 coupled to bus 801 for processing information. Architecture 800 further includes a random access memory (RAM) or other dynamic storage device 803 (referred to herein as main memory), coupled to bus 801 for storing information and instructions to be executed by processor 802. Main memory 803 also may be used for storing temporary variables or other intermediate information during execution of instructions by processor 802. Architecture 800 may also include a read only memory (ROM) and/or other static storage device 804 coupled to bus 801 for storing static information and instructions used by processor 802.

A data storage device 805 such as a magnetic disk or optical disc and its corresponding drive may also be coupled to architecture 800 for storing information and instructions. Architecture 800 can also be coupled to a second I/O bus 806 via an I/O interface 807. A plurality of I/O devices may be coupled to I/O bus 806, including a display device 808, an input device (e.g., an alphanumeric input device 809 and/or a cursor control device 810).

The communication device 811 allows for access to other computers (e.g., servers or clients) via a network. The communication device 811 may include one or more modems, network interface cards, wireless network interfaces or other interface devices, such as those used for coupling to Ethernet, token ring, or other types of networks.

While some specific embodiments of the present disclosure have been shown, the present disclosure should not be interpreted to limit the scope of the present disclosure to these embodiments. For example, most functions performed by electronic hardware components may be duplicated by software emulation. Thus, a software program written to accomplish those same functions may emulate the functionality of the hardware components in input-output circuitry. The present disclosure is to be understood as not limited by the specific embodiments described herein, but only by scope of the appended claims.

Embodiments as described herein have significant advantages over previously developed implementations. As will be apparent to one of ordinary skill in the art, other similar apparatus arrangements are possible within the general scope. The embodiments described above are intended to be exemplary rather than limiting, and the bounds should be determined from the claims.

What is claimed is:

1. A system for establishing peer-to-peer (P2P) communication comprising:
a first peer agent serving a first peer;
a second peer agent serving a second peer;
a rendezvous server having a hardware processor for establishing in a network a first Internet Protocol (IP) address of the first peer for the first peer agent to the second peer agent and a second Internet Protocol (IP) address of the second peer for the second peer agent to the first peer agent, and updating at least one of the first IP address for the first peer agent to the second peer agent and the second IP address for the second peer agent to the first peer agent when at least one of the first and second IP addresses becomes obsolete;
wherein the first peer agent and the second peer agent communicate with the rendezvous server over the network by dropping and retrieving a plurality of dead-drop packages,
wherein a first dead-drop package of the plurality of dead-drop packages comprises a first alias identifying one of the first peer and the second peer, wherein the first alias is known only to the first peer and the second peer,
wherein a second dead-drop package of the plurality of dead-drop packages comprises a second alias that is different from the first alias; and
wherein anonymous certificates for the first peer and the second peer are used for a public key operation, the anonymous certificates having locally generated random identities and public keys.

2. The system of claim 1, wherein the plurality of dead-drop packages is transported via a plurality of layers of an interconnected supporting transport network.

3. The system of claim 2, wherein the plurality of layers comprises Network Address and Port Translators (NAPT).

4. The system of claim 1 further comprises a session traversal utilities for network address translation (STUN) server to determine the first IP address of the first peer and the second IP address of the second peer.

5. The system of claim 1 further comprises a traversal using relays around network address translation (TURN) server to interconnect a network path between the first peer and the second peer.

6. The system of claim 1 further comprises a random number generator (RNG) server, wherein the RNG server uses a random bit stream and generates the first alias or the second alias, an encryption key, and a random parameter to select a sequence of rendezvous servers to communicate the plurality of dead-drop packages between the first peer and the second peer.

7. The system of claim 6, wherein the random bit stream generated by the RNG server is decoupled from an application of random bits.

8. The system of claim 7, wherein the random bits are not re-used.

9. The system of claim 7, wherein a string of random bits generated by the RNG server is encoded as hex characters.

10. The system of claim 1, wherein the system provides an initial boot-strapping process to exchange peer identities between the first peer and the second peer.

11. The system of claim 1, wherein the first peer and the second peer discover, create, and exchange IP addresses, ports, and cryptographic parameters to establish a direct network connection without an aid of an intermediate application server or proxy.

12. The system of claim 1, wherein the first dead-drop package is used to establish an alternate path for communication when a direct network connection is lost.

13. The system of claim 1, wherein a locally entered nickname of first peer and the second peer is not transmitted over the network.

14. The system of claim 1, wherein an encryption key for encrypting the plurality of dead-drop packages is shared between the first peer and the second peer and is not escrowed on a third party server.

15. The system of claim 1, wherein application data of a peer application is encrypted on a peer client by a password.

16. The system of claim 1, wherein the first peer and the second peer non-deterministically hop among a plurality of rendezvous servers, and a sequence of the plurality of rendezvous servers is determined by a peer application.

17. The system of claim 16, wherein the sequence of the plurality of rendezvous servers is randomly chosen.

18. The system of claim 16, wherein the plurality of rendezvous servers is dispersed across multiple networks and geographies.

19. The system of claim 16, wherein the rendezvous server is dynamically created and destroyed.

20. The system of claim 1, wherein there is no subscription relationship between the first peer and the second peer and the rendezvous server.

21. The system of claim 1, wherein there is no registry of the first peer and the second peer.

22. The system of claim 1, wherein the first peer and the second peer are asynchronously connected to the rendezvous server.

23. The system of claim 1, wherein naming and addressing of the rendezvous server is decoupled via a domain name server (DNS) or registries to map names to addresses.

24. The system of claim 1, wherein the rendezvous server stores the plurality of dead-drop packages for a limited time.

25. The system of claim 1, wherein the rendezvous server does not maintain logs.

26. The system of claim 1, wherein the first peer drops the first dead-drop package, and wherein the rendezvous server allows the first peer to determine a time to delete the first dead-drop package.

27. The system of claim 26, wherein the first peer sends an explicit delete message to the rendezvous server.

28. The system of claim 26, wherein the first dead-drop package is deleted by a package timer.

29. The system of claim 1, wherein the first peer drops the first dead-drop package and the second peer knows the first alias contained in the first dead-drop package, and wherein the rendezvous server allows the second peer to retrieve the first dead-drop package.

30. The system of claim 29, wherein the second peer sends a request to the rendezvous server to retrieve the first dead-drop package that contains a plurality of aliases.

31. The system of claim 1, wherein a rendezvous time is randomly chosen and pre-arranged between the first peer and the second peer.

32. The system of claim 1, wherein the first peer and the second peer asymmetrically use a disjoint set of rendezvous servers to exchange the plurality of dead-drop packages.

33. The system of claim 32, wherein the first peer drops the first dead-drop package on a first rendezvous server and the second peer drops the second dead-drop package on a second rendezvous server.

34. The system of claim 1, wherein information needed to successfully pick-up a package and successfully decode the first drop-dead package is pre-arranged.

35. The system of claim 34, wherein the information comprises the first alias, the second alias, an encryption key, location information of the rendezvous server, a time of a package drop, and a package type.

36. The system of claim 35, wherein the information is pre-arranged across the plurality of dead-drop packages.

37. The system of claim 1, wherein the first peer and the second peer use an onion router network to hide the first IP address and the second IP address.

38. The system of claim 1, wherein the first dead-drop package is a uniform nondescript encrypted package.

39. The system of claim 38, wherein the first dead-drop package is padded to achieve a uniform size to minimize traffic analysis.

40. The system of claim 38, wherein the first dead-drop package has an encrypted part encrypted with an encryption key and an unencrypted part.

41. The system of claim 40, wherein the unencrypted part reveals an identity of the first peer or the second peer.

42. The system of claim 40, wherein information needed to establish communication between the first peer and the second peer is carried in the encrypted part.

43. The system of claim 40, wherein the encrypted part contains a status of a presence of a peer.

44. The system of claim 40, wherein the encrypted part contains a current set of IP addresses and ports to directly connect to a peer.

45. The system of claim 40, wherein the encrypted part contains a sequence of aliases to use to communicate with a peer.

46. The system of claim 40, wherein the encrypted part contains a sequence of a plurality of rendezvous servers to search.

47. The system of claim 40, wherein the encrypted part contains a sequence of times to search a rendezvous server of a plurality of rendezvous servers.

48. The system of claim 40, wherein the encrypted part contains a sequence of encryption keys to decrypt dead-drop packages.

49. The system of claim 40, wherein the encrypted part contains a public key to use for a peer.

50. The system of claim 40, wherein the encrypted part contains a ciphersuite to decrypt a dead-drop package.

51. The system of claim 40, wherein the encrypted part contains a set of cipher parameters to decrypt a dead-drop package.

52. The system of claim 40, wherein the encryption key is changed after each use or exposure to a rendezvous server.

53. The system of claim 40, wherein the encryption key is changed after a prearranged period of time.

54. The system of claim 1, wherein a particular alias contained in a particular dead-drop package is changed each time the particular alias is exposed on the rendezvous server.

55. The system of claim 54, wherein the particular alias is changed based on a pre-arranged period of time.

56. The system of claim 54, wherein the particular alias identifies a sender or a receiver of the particular dead-drop package.

57. The system of claim 41, wherein different aliases are used for different peers.

\* \* \* \* \*